(12) United States Patent
Baker et al.

(10) Patent No.: US 11,203,519 B2
(45) Date of Patent: Dec. 21, 2021

(54) REFUEL ADAPTER

(71) Applicant: Eaton Intelligent Power Limited, Dublin (IE)

(72) Inventors: Graham P. Baker, Issaquah, WA (US); Ken Fenger, Aliso Viejo, CA (US)

(73) Assignee: Eaton Intelligent Power Limited, Dublin (IE)

( * ) Notice: Subject to any disclaimer, the term of this patent is extended or adjusted under 35 U.S.C. 154(b) by 16 days.

(21) Appl. No.: 16/705,735

(22) Filed: Dec. 6, 2019

(65) Prior Publication Data

US 2020/0180942 A1 Jun. 11, 2020

Related U.S. Application Data

(60) Provisional application No. 62/777,418, filed on Dec. 10, 2018.

(51) Int. Cl.
*B67D 7/36* (2010.01)
*F16K 1/20* (2006.01)
*B67D 7/04* (2010.01)

(52) U.S. Cl.
CPC ............. *B67D 7/36* (2013.01); *B67D 7/04* (2013.01); *F16K 1/2021* (2013.01)

(58) Field of Classification Search
CPC ........... B67D 7/36; B67D 7/04; F16K 1/2021; Y10T 137/8791; Y10T 137/7839
See application file for complete search history.

(56) References Cited

U.S. PATENT DOCUMENTS

| | | | |
|---|---|---|---|
| 3,168,906 A * | 2/1965 | Brown | F16L 37/36 137/627.5 |
| 4,907,630 A | 3/1990 | Kulikowski et al. | |
| 7,325,569 B2 * | 2/2008 | Denike et al. | B64D 13/02 137/512.1 |
| 2008/0197312 A1 * | 8/2008 | Brinks | F16K 1/2263 251/305 |
| 2017/0016540 A1 * | 1/2017 | Hartman | F16K 1/2261 |

* cited by examiner

*Primary Examiner* — Kevin L Lee
(74) *Attorney, Agent, or Firm* — Fishman Stewart PLLC

(57) ABSTRACT

A refuel adapter, which may, among other things, be suitable for aircraft refueling includes a casing and a butterfly valve disposed within an interior of the casing. The butterfly valve includes a body defining an opening and a disc rotatable within the body about an axis of rotation to selectively close the opening. The disc includes at least one opening therethrough, and a first flap and a second flap are each rotatably attached to the disc to selectively cover a portion of the at least one opening. The butterfly valve may be movable between (i) a static position in which the disc and the first and second flaps are in a closed position, (ii) a refuel position in which the disc may be in a closed position and the flaps are in an open position, and (iii) a defuel position in which the disc may be in an open position.

20 Claims, 6 Drawing Sheets

REFUEL ADAPTER

CROSS-REFERENCE TO RELATED APPLICATIONS

This application claims priority to U.S. Provisional Application No. 62/777,418, filed on Dec. 10, 2018, the contents of which are herein incorporated by reference in their entirety.

TECHNICAL FIELD

The present disclosure generally relates to refuel devices, including refuel adapters with double flap valves.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Refueling adapters are used, for example and without limitation, in aircraft refueling. To address certain needs and/or regulations, such as FAA regulations where the refuel gallery may be pressurized in flight, a refuel adapter may be required to have, in addition to a jaw ring valve, a second flapper valve that precludes reverse and external flow from the refuel adapter. In addition to stopping the reverse flow, the second adapter can prevent defuel from the adapter. To address such a situation, some form of manual override may be required to open the flap valve. Such a manual override should not affect refuel operation so that an operator can refuel without requiring manipulation of a feature on the refuel adapter and only requiring operator interaction if a defuel is required.

However, there can be an issue with such conventional solutions, for example, if the flap valve manual override is inadvertently moved during defuel, the flapper valve may move into the defuel flow, which in turn can cause the flap to slam closed, and can cause a very high surge pressure in the refuel gallery. That can potentially break the flapper and require a complex external damper system to avoid the flapper movement transitioning to the defuel handle where rapid handle movement could cause issues and, in some instances, potentially cause injury.

There is a desire for solutions/options that address or eliminate one or more challenges or shortcomings associated with current refuel adapters. The foregoing discussion is intended only to illustrate examples of the present field and should not be taken as a disavowal of scope.

SUMMARY

A refuel adapter, which may, among other things, be suitable for aircraft refueling may include a casing and a butterfly valve disposed within an interior of the casing. The butterfly valve may include a body defining an opening, a disc rotatable within the body about an axis of rotation to selectively close the opening, the disc having at least one opening therethrough, and a first flap and a second flap each rotatably attached to the disc to selectively cover a portion of the at least one opening. The butterfly valve may be movable between (i) a static position in which the disc and the flaps may be in closed positions, (ii) a refuel position in which the disc may be in a closed position and the flaps in open positions, and (iii) a defuel position in which the disc may be in an open position.

DETAILED DESCRIPTION

Figure 1:
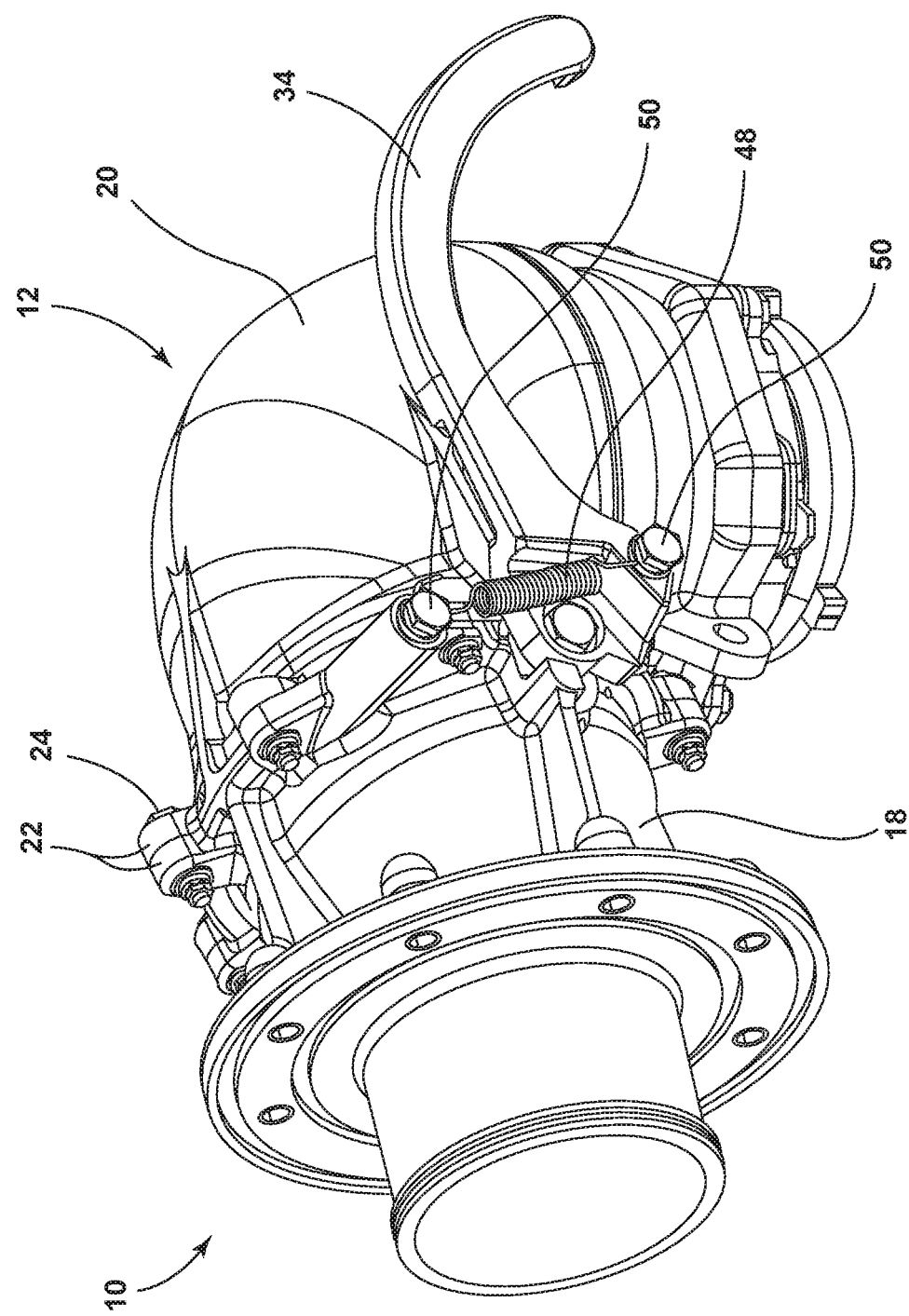
FIG. 1 generally illustrates a perspective view of an embodiment of a refuel adapter in a static or refuel position according to aspects and teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Referring now to the figures, as generally illustrated in FIGS. 1-5, in embodiments, a refuel adapter 10 may include a casing 12 defining a flow passage 14, and a butterfly valve 16 disposed therein. The butterfly valve 16 generally may be configured to selectively open and close the flow passage 14 to allow for the flow of fuel therethrough either for refueling or defueling of a vehicle, including, but not limited to an aircraft.

With embodiments, the casing 12 may include a first component 18 and a second component 20 removably attached to each other. For example and without limitation, the first component 18 and the second component 20 may each have corresponding threaded portions 22 configured to receive a fastener 24, such as a bolt, to hold the first component 18 and second component 20 together. The butterfly valve 16 may be installed at or around this connection area. In embodiments, the first component 18 may be configured to be connected to the vehicle, and the second component 20 may be configured to be connected to a refueling device or apparatus. The second component 20 may include a bend (e.g., 90 degree turn) to facilitate connection with the refueling device or apparatus.

As generally illustrated in FIGS. 3-8, in embodiments, the butterfly valve 16 may include a body 26 defining an opening 27 therethrough, a disc 28, a first stem 30, and/or a second stem 32. The body 26 of the butterfly valve 16 generally may be fixedly connected within the casing 12, for example, via one or more fasteners 29. The butterfly valve 16 may include a seal 36 between the body 26 and an inner surface of the casing 12 to ensure that no fluid (e.g., fuel) will leak past the butterfly valve 16.

With embodiments, the first and/or second stems 30, 32 may be fixedly connected to the disc 28 and rotatably connected to the casing 12 (e.g., to the first component 18 and/or the second component 20) such that the disc 28 may be rotatable within the body 26 between an open position (FIGS. 5 and 8) and a closed position (FIGS. 3, 4, 6, and 7) to selectively open and close the opening 27 in the body 26. For example and without limitation, in embodiments generally seen in FIGS. 3-5, the first stem 30 may be rotatably connected to the first component 18, and the second stem 32 may be rotatably connected to the second component 20. However, it should be appreciated that the first and second stems 30, 32 may both be rotatably connected to the first component 18 or to the second component 20.

In embodiments, the butterfly valve 16 may include a handle 34 non-rotatably connected to the disc 28 to facilitate actuation of the disc 28 (e.g., rotation of the disc 28 within the body 26 between the open and closed positions). For example and without limitation, the handle 34 may connected to the first stem 30 or to the second stem 32. The handle 34 may further be connected to a spring 48, where the spring constant of the spring may determine the amount of force necessary to move the handle 34. The spring may be connected to fasteners 50 (e.g., bolts) attached to the casing 12 (e.g., the first component 20 and/or the second component 22).

With embodiments, the disc 28 may include an opening or plurality of openings 38 and/or one or more braces 40 defining the openings 38. The braces 40 may be arranged substantially perpendicular to each other. The braces 40 further may be sized and/or arranged such that the openings 38 may be arranged in quadrants of the disc 28 and/or have the same size and/or geometry. The butterfly valve 16 may include a first flap 42 and a second flap 44 each rotatably connected to the disc 28 between an open position (FIGS. 4 and 7) and a closed position (FIGS. 3 and 6) to selectively open and close the opening(s) 38. For example and without limitation, the butterfly valve 16 may include a hinge 46 to which first flap 42 and/or the second flap 44 may be attached. The hinge 46 may be aligned with or positioned along a diameter of the disc 28 (e.g., mounted on or connected to a brace 40). An axis of rotation of the flaps 42, 44 defined by the hinge 46 may be substantially transverse to an axis of rotation of the disc 28 within the body 26 of the butterfly valve 16. The first flap 42 and the second flap 44 may be substantially the same size, have substantially the same shape, and/or substantially mirror each other about the hinge 46.

Figure 3:
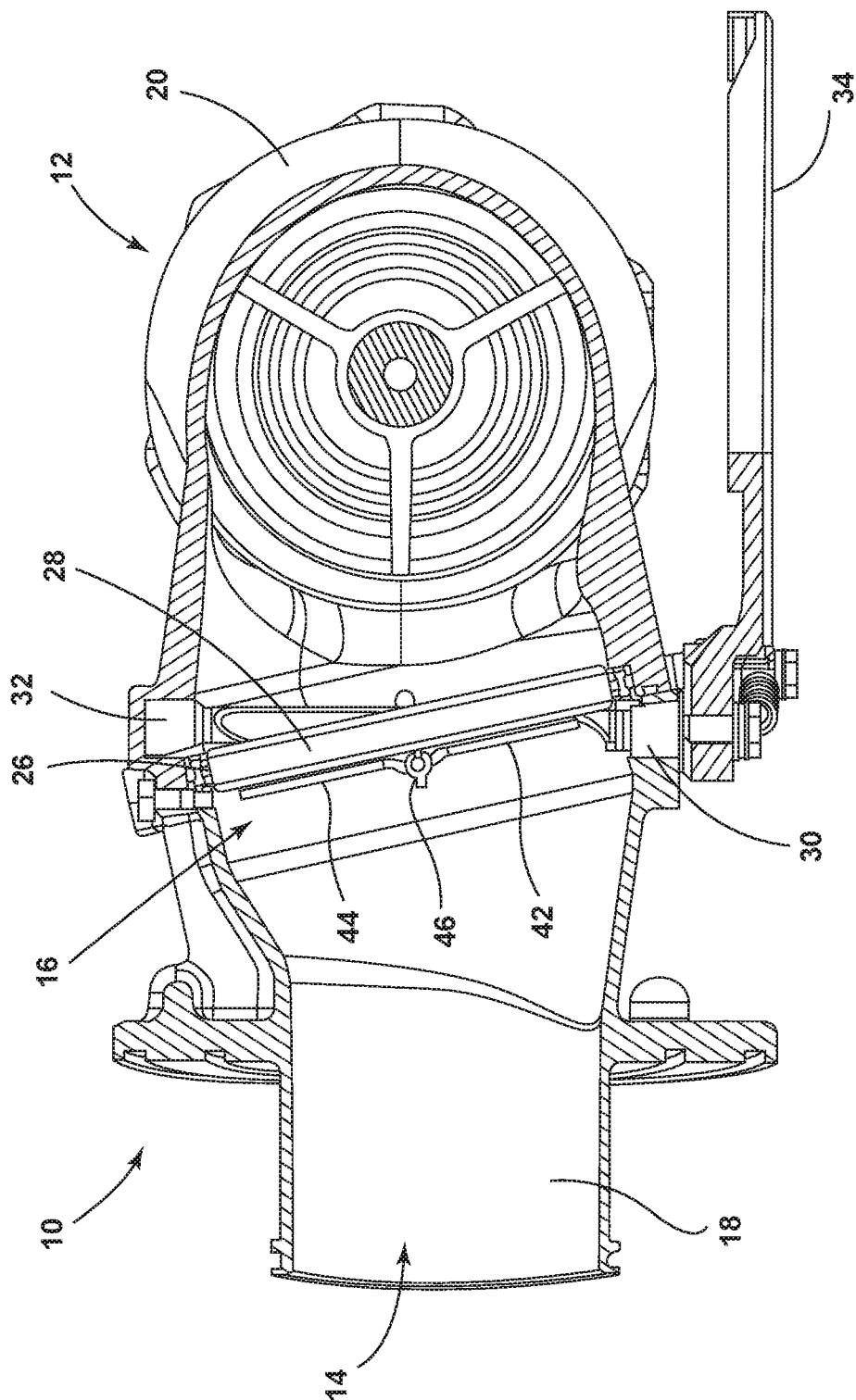
FIG. 3 generally illustrates a cross-sectional view of a refuel adapter in a static position according to aspects and teachings of the present disclosure.
Figure 6:
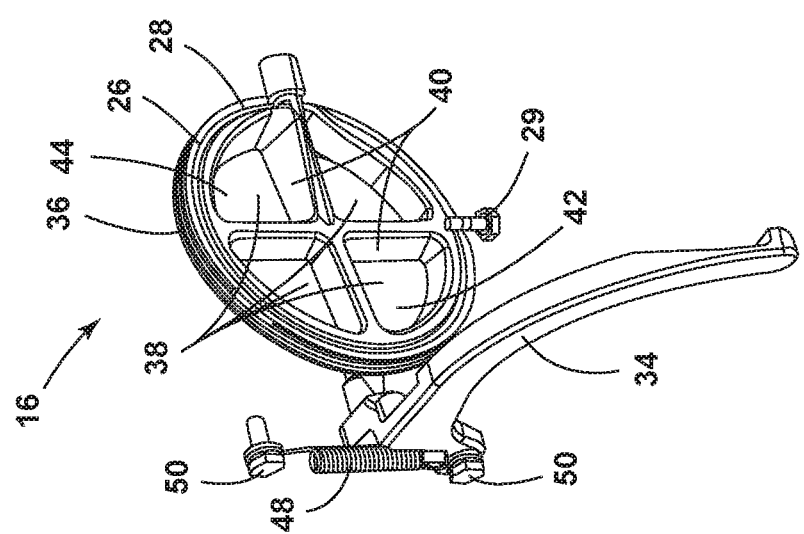
FIG. 6 generally illustrates a cross-sectional view of a butterfly valve of a refuel adapter in a static position according to aspects and teachings of the present disclosure.

In embodiments, the butterfly valve 16 may be movable between at least three different positions: a static position, a refuel position, and a defuel position. In the static position, such as generally illustrated in FIGS. 1, 3, and 6, the disc 28 may be in a closed position such that the opening 27 in the body 26 may be closed, and the first flap 42 and the second flap 44 are also in closed positions such that the openings 38 in the disc 38 also may be closed. As such, in the static position, no fluid (e.g., fuel) can flow through the butterfly valve 16 either in a refuel direction (from the fueling apparatus or device to the vehicle) or in an opposing defuel direction (from the vehicle).

Figure 4:
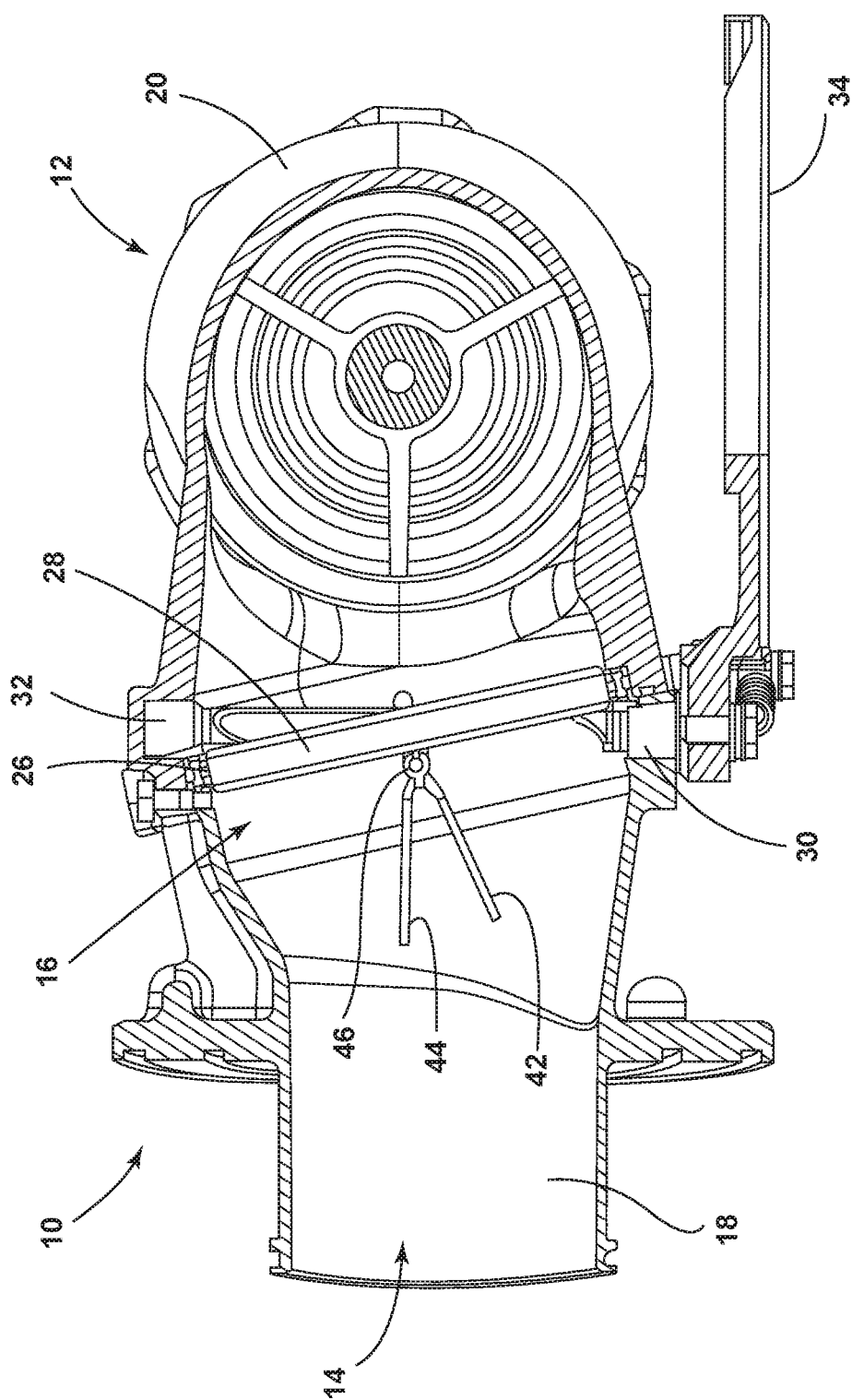
FIG. 4 generally illustrates a cross-sectional view of a refuel adapter in a refuel position according to aspects and teachings of the present disclosure.
Figure 7:
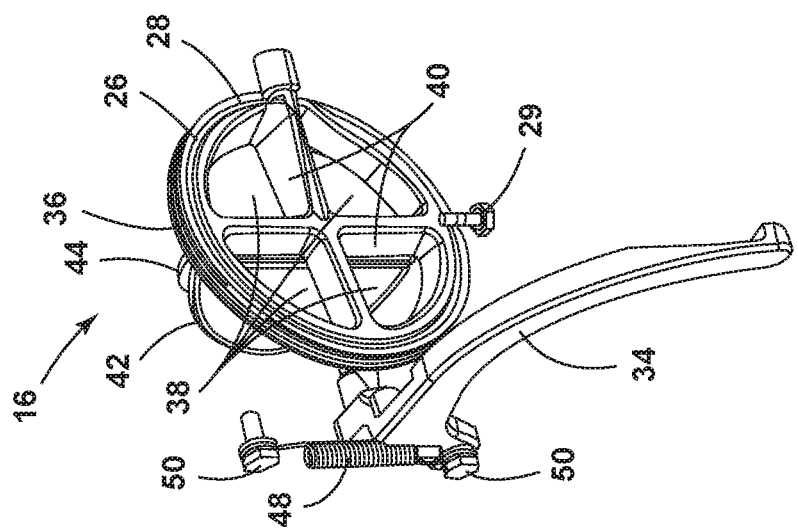
FIG. 7 generally illustrates a cross-sectional view of a butterfly valve of a refuel adapter in a refuel position according to aspects and teachings of the present disclosure.

In the refuel position, such as generally illustrated in FIGS. 1, 4, and 7, the disc 28 may be in a closed position such that the opening 27 in the body 26 may be closed, and the first flap 42 and the second flap 44 are in open positions such that the openings 38 are open. The first flap 42 and/or the second flap 44 may be configured to move into the open position from the closed position at a set pressure (e.g., from the fluid acting on the flaps 42, 44). The set pressure may be set, for example, at the hinge 46. As such, during refueling, the fueling device or apparatus may supply the fuel at a pressure that exceeds the set pressure, thereby forcing the flaps 42 and/or 44 open such that the fuel can flow past the butterfly valve 16 to the vehicle. When the pressure of the fluid is below the set pressure, the flaps 42, 44 may close, such that the butterfly valve 16 is back in the static position. The first flap 42 and the second flap 42 may be configured to open at the same set pressure or at different set pressures.

Figure 2:
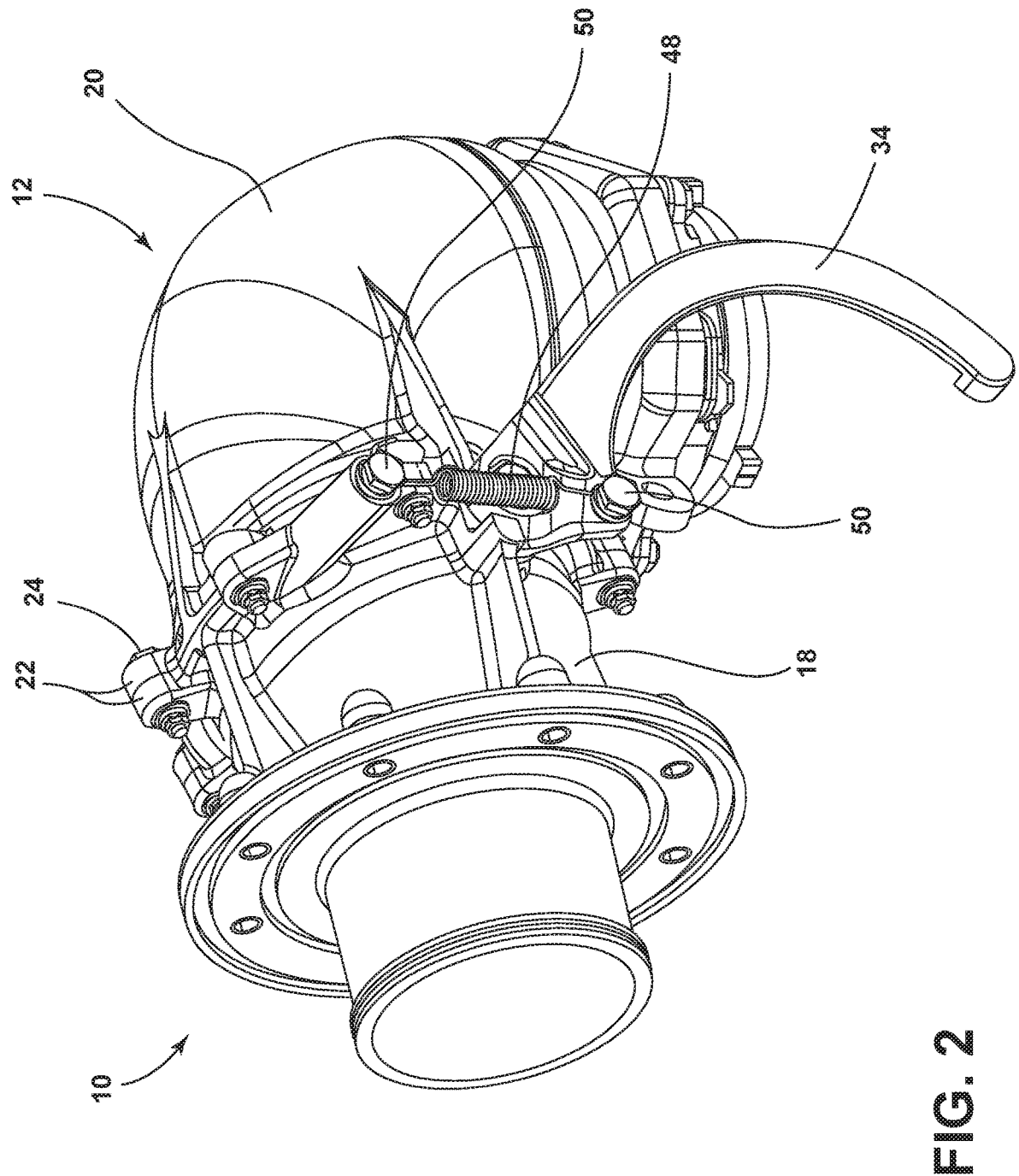
FIG. 2 generally illustrates a perspective view of an embodiment of a refuel adapter in a defuel position according to aspects and teachings of the present disclosure.
Figure 5:
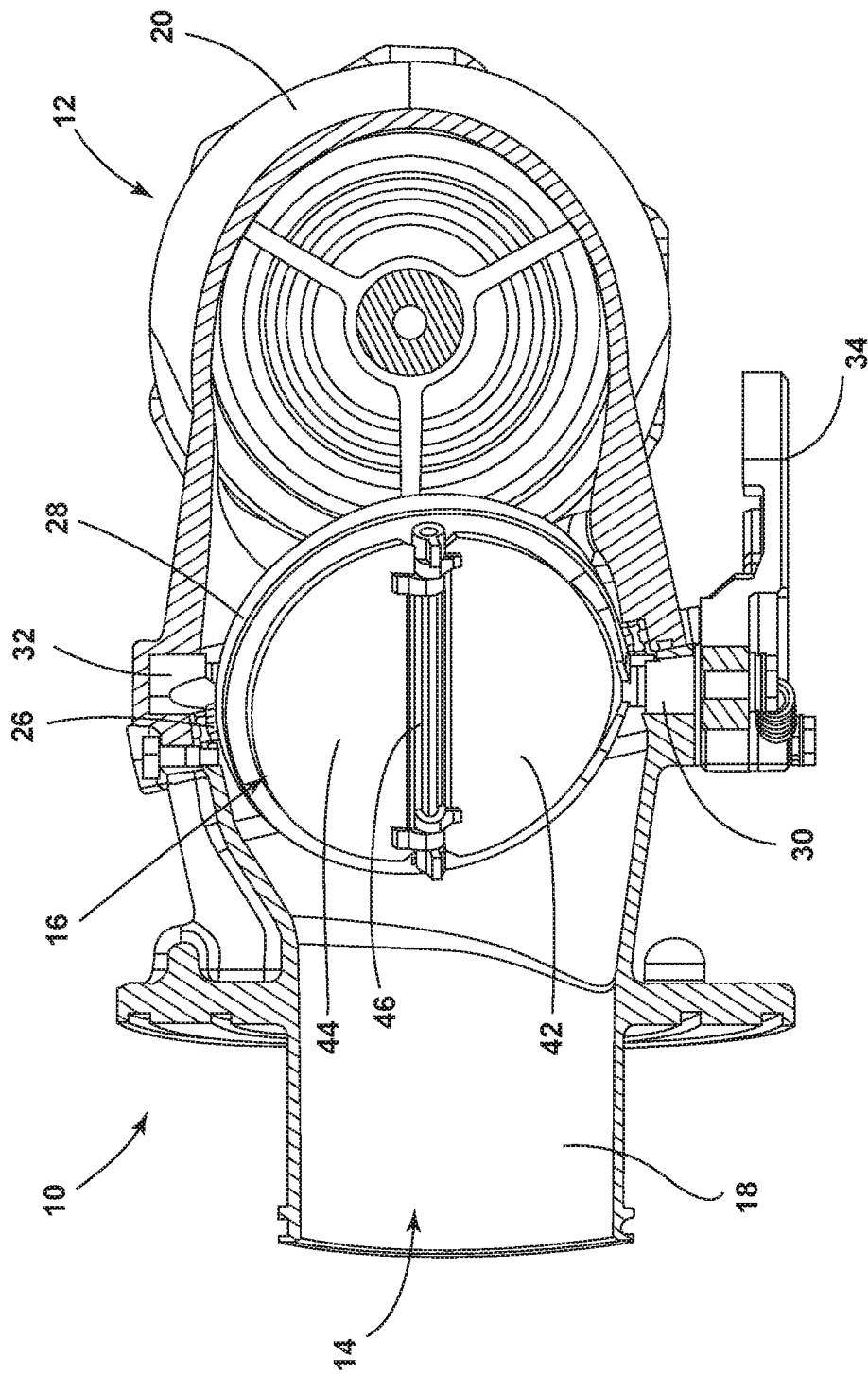
FIG. 5 generally illustrates a cross-sectional view of a refuel adapter in a defuel position according to aspects and teachings of the present disclosure.
Figure 8:
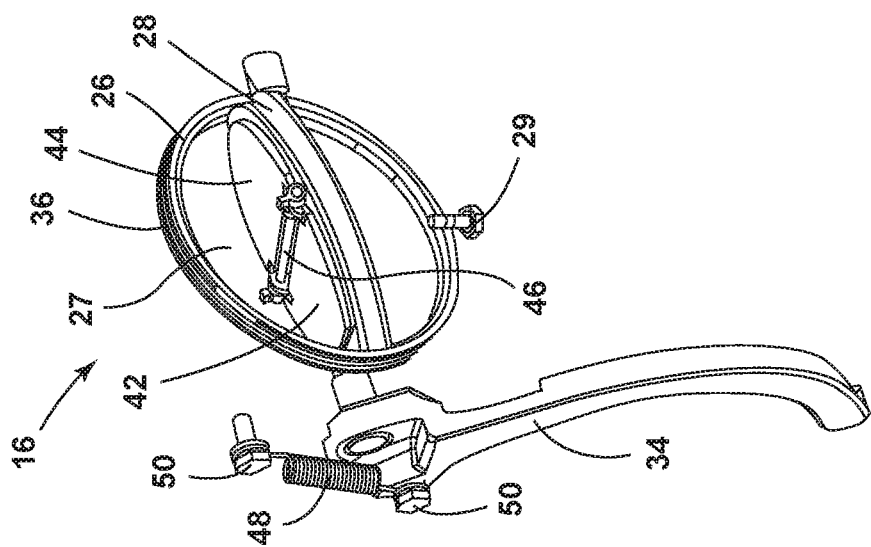
FIG. 8 generally illustrates a cross-sectional view of a butterfly valve of a refuel adapter in a defuel position according to aspects and teachings of the present disclosure.

In the defuel position, such as generally illustrated in FIGS. 2, 5, and 8, the disc 28 may be in an open position such that the opening 27 in the body 26 may be open. The first flap 42 and the second flap 44 may be in closed positions. The defuel position allows for fluid (e.g., fuel) to flow from the vehicle to the refuel apparatus or device, a container, or the like for defueling of the vehicle. The butterfly valve 16 may be actuated into the defuel position from the static position and/or the refuel position via the handle 34. In embodiments, the butterfly valve 16 may be configured such that if the handle 34 is inadvertently moved during defuel operation, there may be a pressure balance associated with the butterfly valve 16 such that a flow pressure may act equally and opposite of an opening part and a closing part of the butterfly valve 16. As such, the fuel flow will not cause the valve to slam closed, which can avoid a high-pressure surge and/or helping to mitigate or minimize issues and/or a risk of injury to an operator, thereby eliminating a need for more complex damping arrangements.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A refuel adapter comprising:
   a casing; and
   a butterfly valve disposed within an interior of the casing, the butterfly valve including:
   a body defining an opening;
   a disc rotatable within the body about an axis of rotation to selectively close the opening, the disc having at least one opening therethrough; and
   a first flap and a second flap, each rotatably attached to the disc to selectively cover a portion of the at least one opening;
   wherein the butterfly valve is movable between (i) a static position in which the disc and the first and second flaps are in closed positions, (ii) a refuel position in which the disc is in a closed position and the first and second flaps are in open positions, and (iii) a defuel position in which the disc is in an open position.

2. The refuel adapter of claim 1, wherein the first flap and the second flap are connected to the disc via a common hinge.

3. The refuel adapter of claim 2, wherein the common hinge is positioned substantially along a diameter of the disc.

4. The refuel adapter of claim 1, wherein an axis of rotation of the first flap and the second flap is substantially transverse to the axis of rotation of the disc.

5. The refuel adapter of claim 1, wherein the first flap and the second flap are at least one of substantially the same size and substantially the same shape.

6. The refuel adapter of claim 5, wherein the first flap and the second flap are configured to substantially mirror each other.

7. The refuel adapter of claim 1, further comprising a handle non-rotatably connected to the disc, the handle being configured to actuate rotation of the disc within the body.

8. The refuel adapter of claim 1, wherein the at least one opening includes four openings.

9. The refuel adapter of claim 8, wherein the disc includes braces to form the four openings.

10. The refuel adapter of claim 8, wherein the four openings are substantially the same size.

11. The refuel adapter of claim 1, wherein the casing includes a first component and a second component removably attached to each other.

12. The refuel adapter of claim 11, wherein one of the first component or the second component includes a bend.

13. The refuel adapter of claim 12, wherein the bend is substantially 90 degrees.

14. The refuel adapter of claim 11, wherein the first component is configured to be attached to a vehicle to be refueled, and the second component is configured to be attached to a refueling apparatus.

15. The refuel adapter of claim 1, wherein the butterfly valve is pressure balanced to prevent inadvertent moving of the butterfly valve out of the defuel position.

16. A butterfly valve for a refuel adapter, comprising:
    a body defining an opening;
    a disc rotatable within the body about an axis of rotation to selectively close the opening, the disc having at least one opening therethrough; and
    a first flap and a second flap, each rotatably attached to the disc to selectively cover a portion of the at least one opening;
    wherein the butterfly valve is movable between (i) a static position in which the disc and the first and second flaps are in closed positions, (ii) a refuel position in which the disc is in a closed position and the first and second flaps are in open positions, and (iii) a defuel position in which the disc is in an open position.

17. The butterfly valve of claim 16, wherein the first flap and the second flap are connected to the disc via a common hinge.

18. The butterfly valve of claim 16, further comprising a handle non-rotatably connected to the disc, the handle being configured to actuate rotation of the disc within the body.

19. The butterfly valve of claim 16, wherein an axis of rotation of the first flap and the second flap is substantially transverse to the axis of rotation of the disc.

20. The butterfly valve of claim 16, wherein the butterfly valve is pressure balanced to prevent inadvertent moving of the butterfly valve out of the defuel position.

* * * * *